US 6,419,203 B1

(12) United States Patent
Dang (10) Patent No.: US 6,419,203 B1
(45) Date of Patent: Jul. 16, 2002

(54) VIBRATION ISOLATOR WITH PARALLELOGRAM MECHANISM

(76) Inventor: Chi Hung Dang, 7901 E. Hardy St., Tucson, AZ (US) 85750

( * ) Notice: Subject to any disclaimer, the term of this patent is extended or adjusted under 35 U.S.C. 154(b) by 0 days.

(21) Appl. No.: 09/909,092

(22) Filed: Jul. 20, 2001

(51) Int. Cl.⁷ .............................................. F16M 13/00
(52) U.S. Cl. ........................ 248/585; 248/638; 248/678
(58) Field of Search ................................ 248/585, 588, 248/584, 594, 560, 638, 678, 550; 188/267, 182

(56) References Cited

U.S. PATENT DOCUMENTS 5,000,415 A * 3/1991 Sandercock ................. 248/550
6,241,059 B1 * 6/2001 Fujita et al. ................. 188/267

* cited by examiner

Primary Examiner—Ramon O. Ramirez (57) ABSTRACT

A vibration isolator apparatus for isolating a load from a floor and minimizing disturbances caused by rapid motions of the load components. The vibration isolator comprises a first isolator assembly that employs a parallelogram mechanism to isolate the load in a first direction while maintaining said load leveled and a second isolator assembly that provides passive isolation for the load in a second direction or directions. The second isolator assembly may include a pendulum assembly that is coupled to a dashpot. A homing means to bring and secure the load to an equilibrium home position during rapid movement of the load components and during interacting process between the load and other devices mounted on different platforms.

15 Claims, 14 Drawing Sheets

VIBRATION ISOLATOR WITH PARALLELOGRAM MECHANISM

BACKGROUND OF THE INVENTION

1. Field of the Invention

The present invention relates to vibration isolator equipment that can isolate a load such as a vibration sensitive instrument from a surface such as a floor of a building.

2. Background of the Invention

For vibration sensitive instruments, the relative motion between two surface induced by vibration can cause errors and reduce accuracy. For example, in the case of a fine resolution microscope, the highly magnified images of a part under inspection are captured and analyzed. If the floor onto which the system is situated undergoes vibrating movement that can be transferred to the instrument, the induced vibration may cause a relative displacement between the two surfaces where the microscope and parts are mounted. Such relative displacement causes the captured images to be too flurry for accurate analysis. To minimize this problem, the equipment incorporates vibration isolators to reduce or prevent the floor vibration from being transferred to the instrument. The most commonly used isolators are active air isolators that are effective and low in cost. With low throughput equipments, where the length of time taken for the system to resettle after a gross disturbance induced to the instrument is not a critical concern, the air isolation table including a highly damped table platform and several active air isolators are sufficient.

However, in a manufacturing process involving automated equipments with fast moving components, the system is subjected to constant acceleration and deceleration of a large mass and shifting center of gravity, those induce gross disturbance to the system. The reduction of resettling time required to eliminate these gross disturbance becomes a key factor since the productivity improves with shortened process cycle time. Furthermore, in this application, the process includes many steps of exchanging parts between devices mounted on different platforms, such as a fully automated apparatus wherein a robotic system mounted on a non-isolated platform fetches and retrieves parts between the instrument and an input/output station. Therefore, it is desirable to bring and lock the instrument to an equilibrium position, referred as the home position, so that the robotic assembly can quickly locate the parts. In summary, the vibration isolator for these applications needs to address the three following critical requirements:

Reduce or prevent the floor vibration, in vertical and horizontal directions, from being transferred to the instrument, Minimize the resettling time after each gross disturbance, Bring and secure the instrument to an equilibrium home position.

With the addition of the last two requirements, an air isolation table becomes inadequate since it takes a long period of time, in order of several seconds to damp out all gross disturbances and resume its leveled position, especially with an instrument having a high center of gravity. To counter this problem, a much larger table is used to increase the mass of the table platform and spicing between the air isolators. This will lead to big increases in cost, weight and footprint of the equipment.

U.S. Pat. No. 5,000,415 issued to Sandercock disclosed an active vibration isolator assembly that includes a plurality of piezoelectric actuators that can vary the distance between the load and the floor surface to compensate for the movement of the floor. U.S. Pat. No. 5,660,255 issued to Schubert et al. disclosed a vibration isolator that has a number of piezoelectric actuators to isolate a load in a vertical direction and additional piezoelectric actuators to isolate the load in a horizontal plane. Such active isolation system may meet all three requirements. However, it has a prohibited cost and complexity due to expensive actuator assemblies and complex feedback servo control systems.

U.S. Pat. No. 6,209,841 issued to Houghton, Jr., et al. disclosed a vibration isolator that has an active isolator assembly as disclosed by Sandercock to isolate the load in a vertical direction and a passive isolator assembly including a pendulum to provide isolation in a horizontal plane. Such system may significantly reduce the cost of the vibration isolator with respect to the isolators of Schubert et al., but still is very complex and expensive in comparison with an active air system.

The present invention provides a novel approach meeting all above three critical requirements that may be satisfied by an active piezoelectric isolator system, but with the cost and simplicity of an active air isolator assembly.

SUMMARY OF THE INVENTION AND OBJECTS

The object of this invention is to provide a vibration isolator that prevents the floor movement from being transferred to a load and minimizes gross disturbances induced by rapid motions of the load, but without the drawbacks that are found in the prior arts.

The apparatus of the present invention comprises an isolator assembly including a parallelogram mechanism that isolates the load in a first direction while maintaining said load leveled and a passive isolator that isolates the load in a second direction or directions.

This and other objects and advantages of this invention will become apparent through examining the following description of the arrangement and construction of the constituent components and appended claims in conjunction with the attached drawings.

DETAILED DESCRIPTION OF THE INVENTION

The embodiment of the present invention comprises an isolator assembly 1 that isolates the load in a first direction and a passive isolator assembly 2 that isolates the load in a second direction or directions. The isolator assembly 1 may include a parallelogram mechanism that is coupled to a spring and dashpot system. The isolator assembly 2 may includes a pendulum that is damped by a dashpot. As the center of gravity of the load moves, the parallelogram mechanism and the pendulum assembly retain the load equilibrium position fixed and leveled with respect to a plane perpendicular to the first direction without assistance from any active feedback control device.

Figure 1:
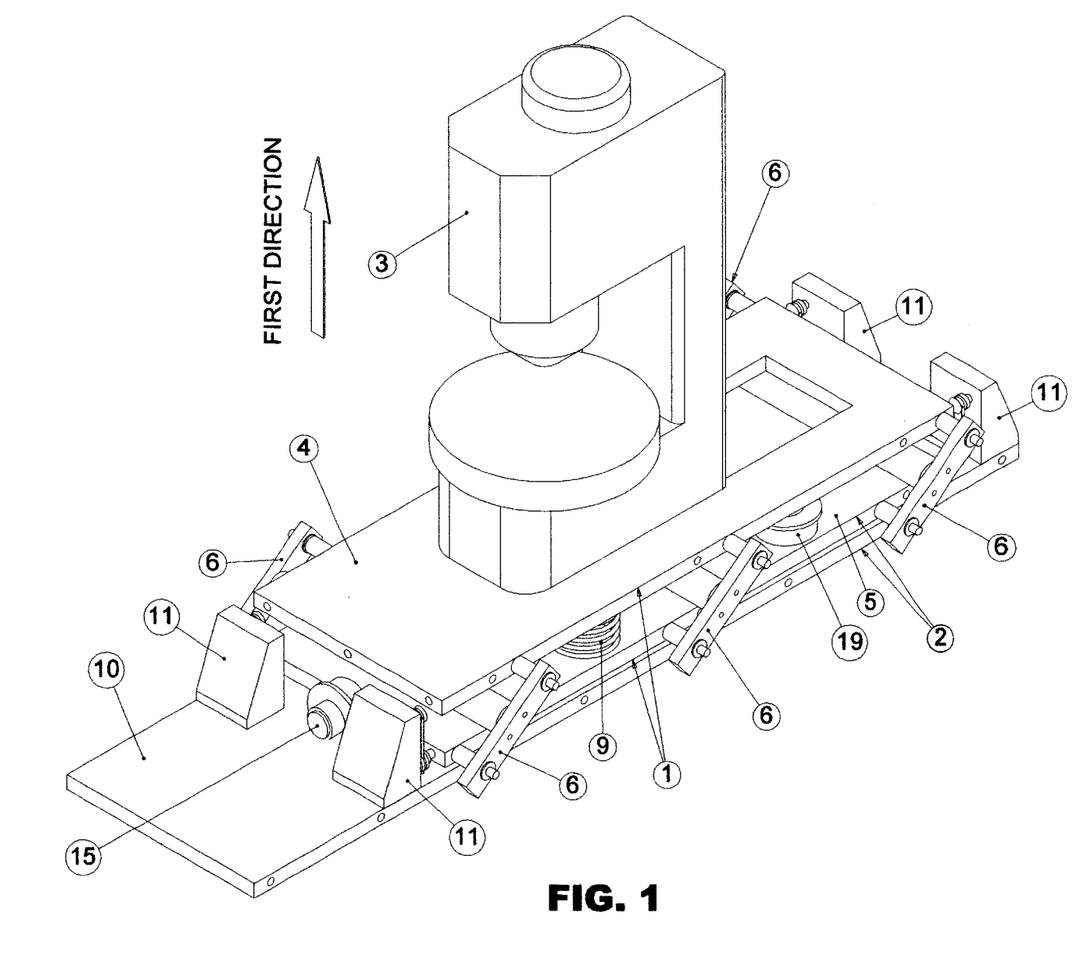
FIG. 1 is an isometric view of a schematic partial illustration of a vibration isolator apparatus that can be employed in the present invention.
Figure 2:
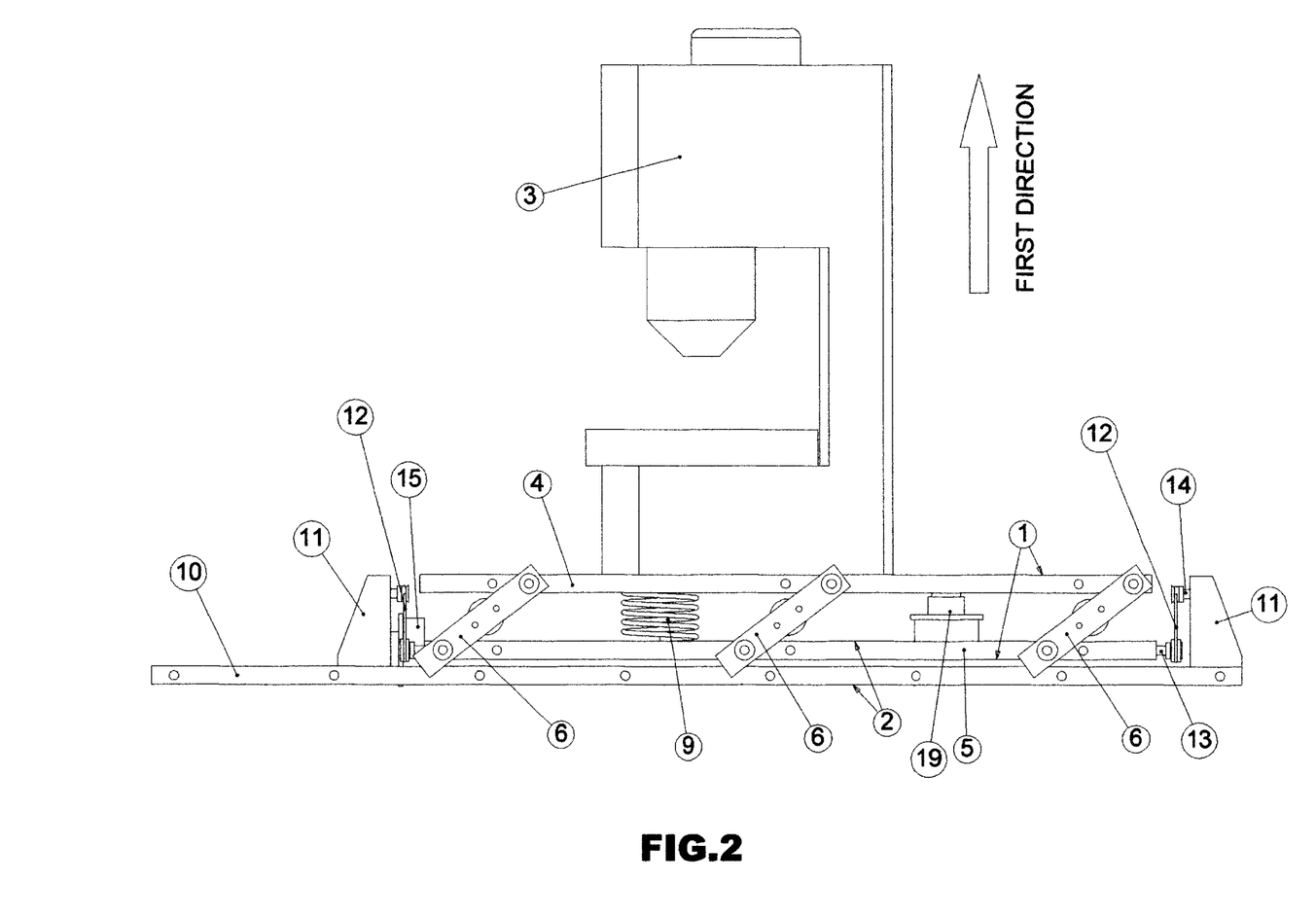
FIG. 2 is a side view of a schematic partial illustration of the vibration isolator apparatus shown in FIG. 1.
Figure 3:
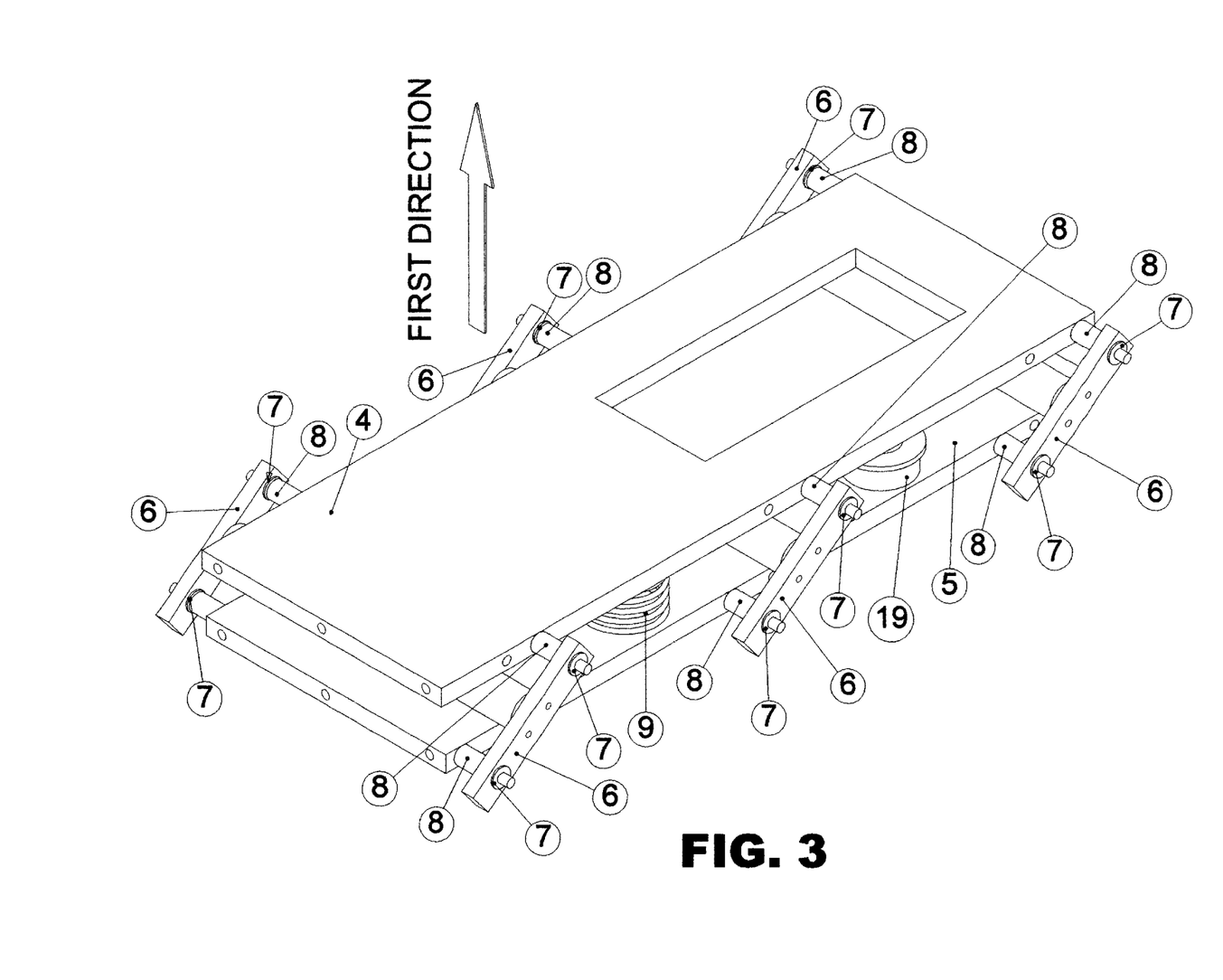
FIG. 3 is an isometric view of a schematic partial illustration of the isolator assembly 1 included in the vibration isolator apparatus shown in FIG. 1.
Figure 4:
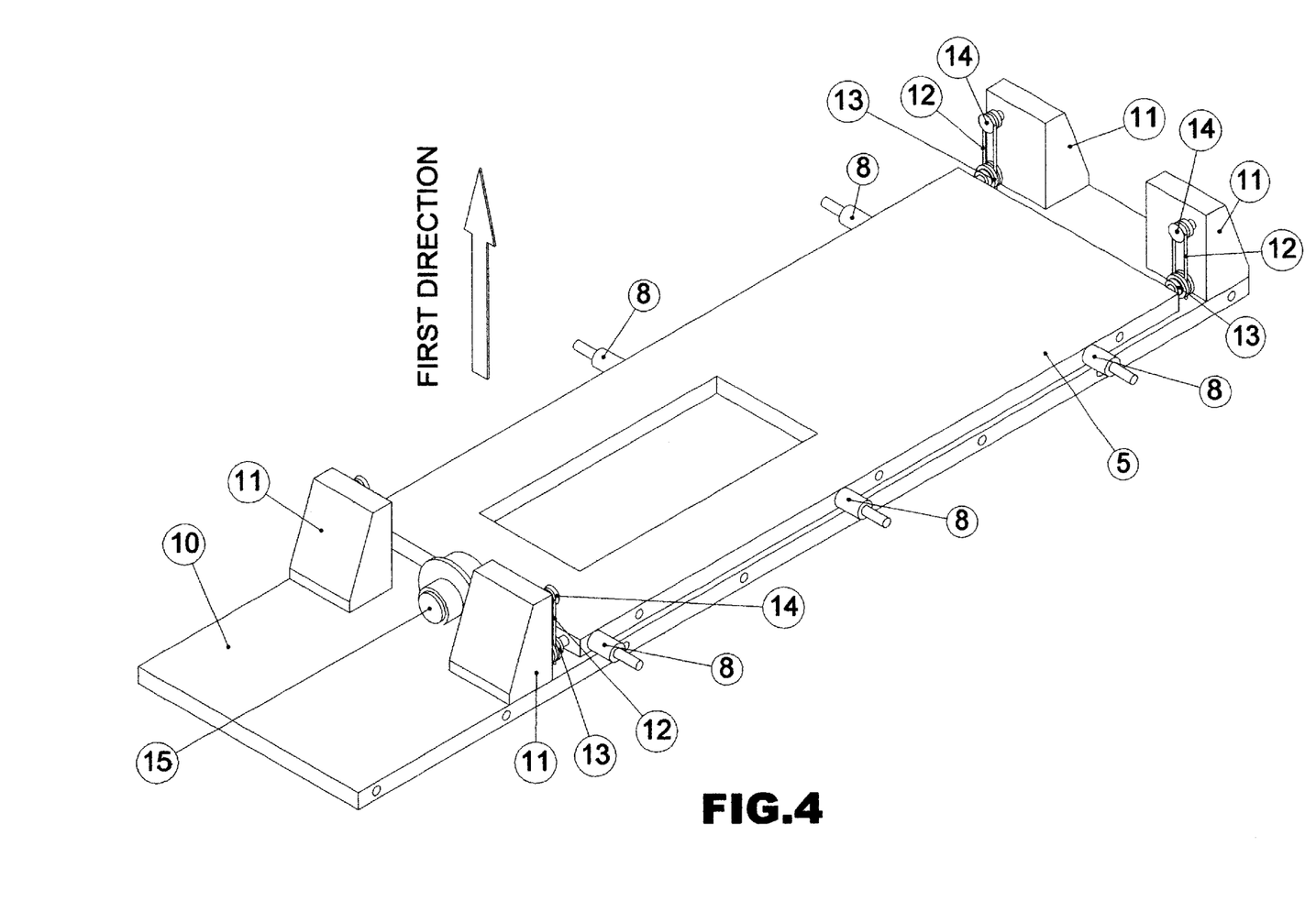
FIG. 4 is an isometric view of a schematic partial illustration of the isolator assembly 2 included in the vibration isolator apparatus shown in FIG. 1, wherein a pendulum assembly is employed.
Figure 5:
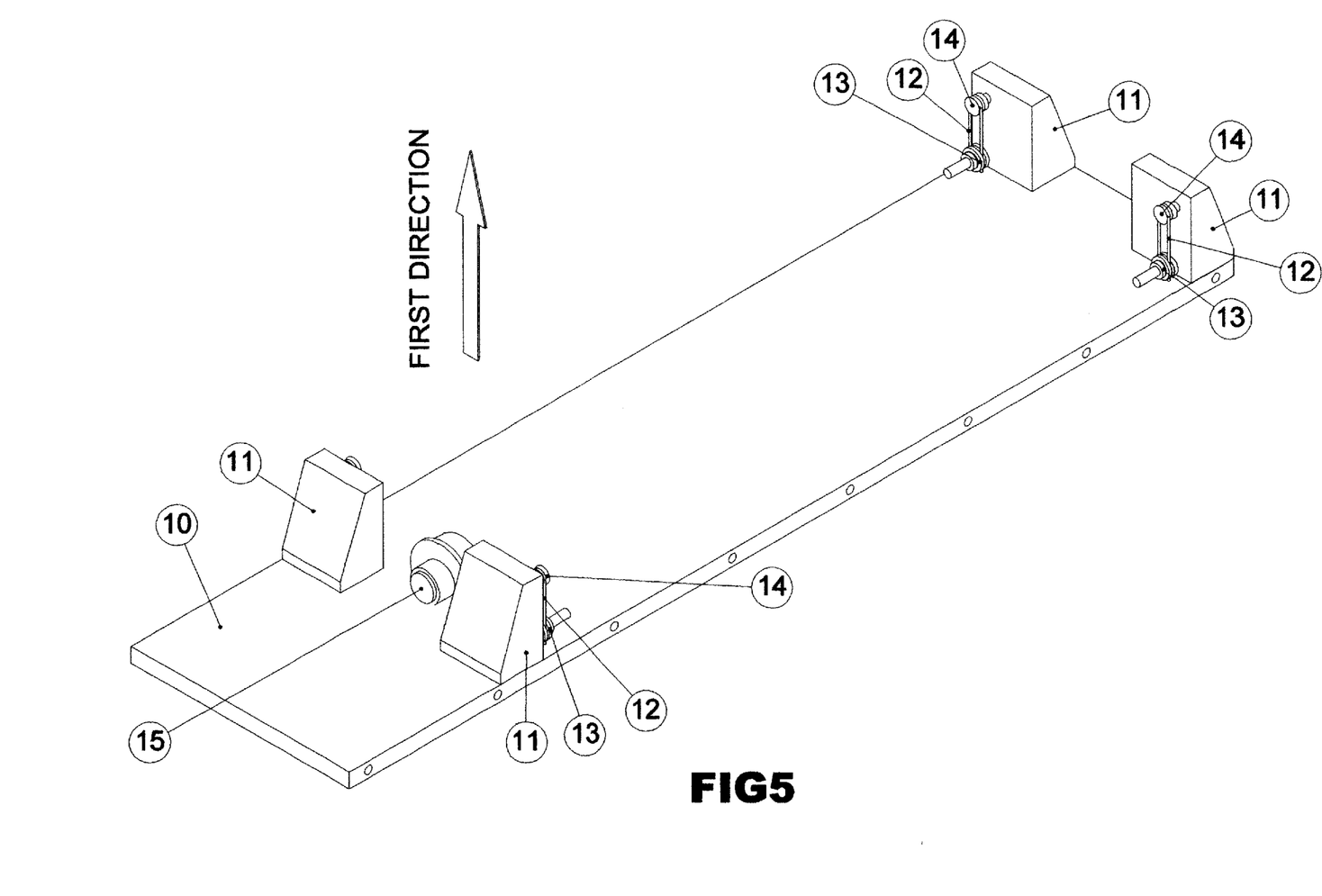
FIG. 5 is an isometric view of a schematic partial illustration of a base structure that supports the pendulum assembly.
Figure 6:
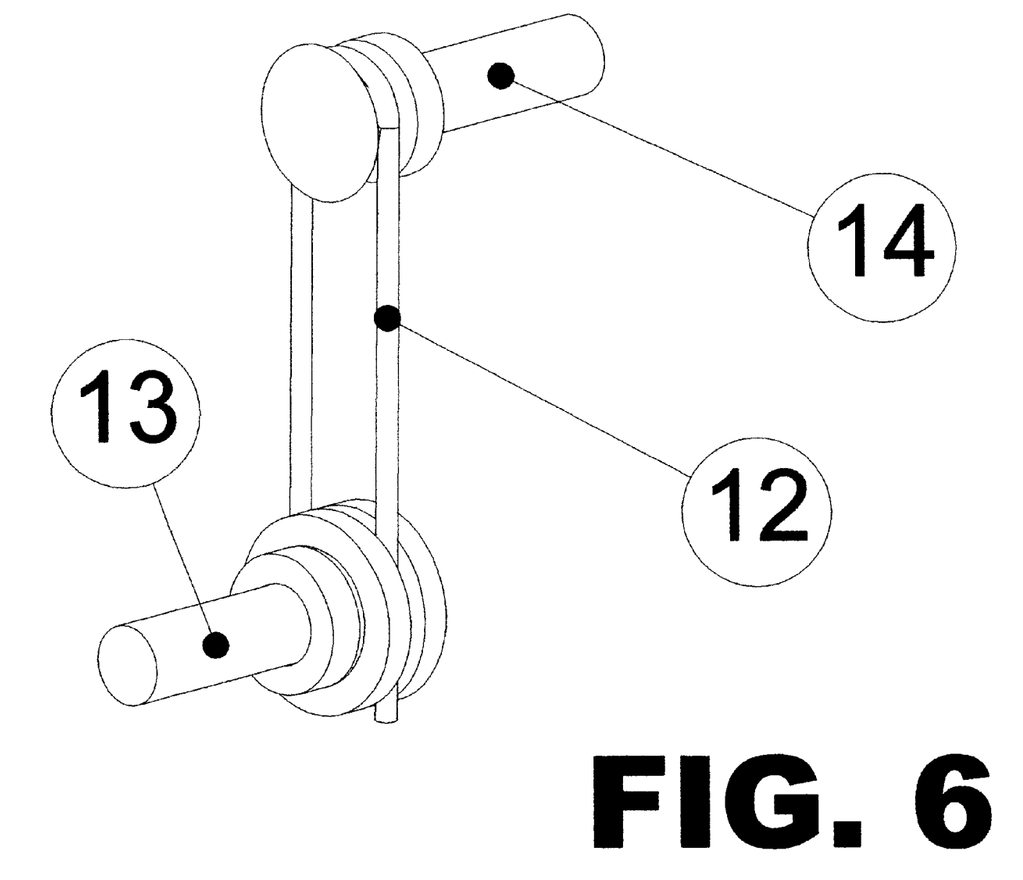
FIG. 6 is an isometric view of a schematic partial illustration of cables and hanging posts that are constituent components of the pendulum assembly.

Referring to FIG. 1 and FIG. 2, one preferred embodiment of the invention comprises:

A top load bearing structure 4 onto which the load 3 is installed, said structure 4 is perpendicular to the first direction. The load may be an optical platform or any vibration sensitive equipment, An intermediate load bearing structure 5 which is parallel to said top load bearing structure 4, A plurality of linkage means 6 interconnecting the top structure 4 to the intermediate structure 5 at rotating axes. As illustrated in FIG. 3, each bearing 7 built in at each end of the linkages 6 are mounted to each shaft 8 extruding along the rotating axes from the sides of the top structure 4 and the sides of the intermediate structure 5. Such arrangement forms a two-dimensional parallelogram mechanism, specifically a four bars linkage system that maintains the parallelism between the top structure 4 and the intermediate structure 5, regardless where the load is applied onto the top structure 4 in the first direction, A spring 9 and dashpot system 19 are coupled to the top structure 4 and the intermediate structure 5 to provide the isolation and to control the gap between the two load bearing structures in the first direction, A base structure 10, onto which a plurality of posts 11 are erected in the first direction (shown in FIG. 5), A plurality of cables or other tension members 12 that extend along the first direction and interconnect the pins 13 and pins 14 extruding form the ends of the intermediate structure 5 and posts 11 respectively (shown in FIG. 6). Such arrangement forms a pendulum assembly that allows the top structures 4 and the intermediate structure 5 to translate in the horizontal direction about the posts 11 (illustrated in FIG. 4). This provides lateral isolation for the load in the second direction or directions, A dashpot system 15 that is coupled to the intermediate structure 4 and the base structure 10 to damp out any relative motion between the two structures that may be induced by acceleration and deceleration of the load or by gross disturbances transferred from the floor to the base structures.

In practice, if the load has an unchanged mass but a moving center of gravity, the above design will retain its equilibrium position fixed and leveled with respect to a plane perpendicular to the first direction. However, in many applications wherein the mass of the load may vary, to keep the gap between two load bearing structures unchanged, the spring 9 must have controllable spring constant or positions of mounting fixtures 30 and 31 where the ends of the spring are captured can be adjusted. The spring constant of an air spring device can be readily adjusted by changing air pressure. In the cases of a mechanical spring, the distance between two mounting fixtures must be varied to compensate for the change of mass, providing the range of the load mass is within the spring capacity.

Figure 7:
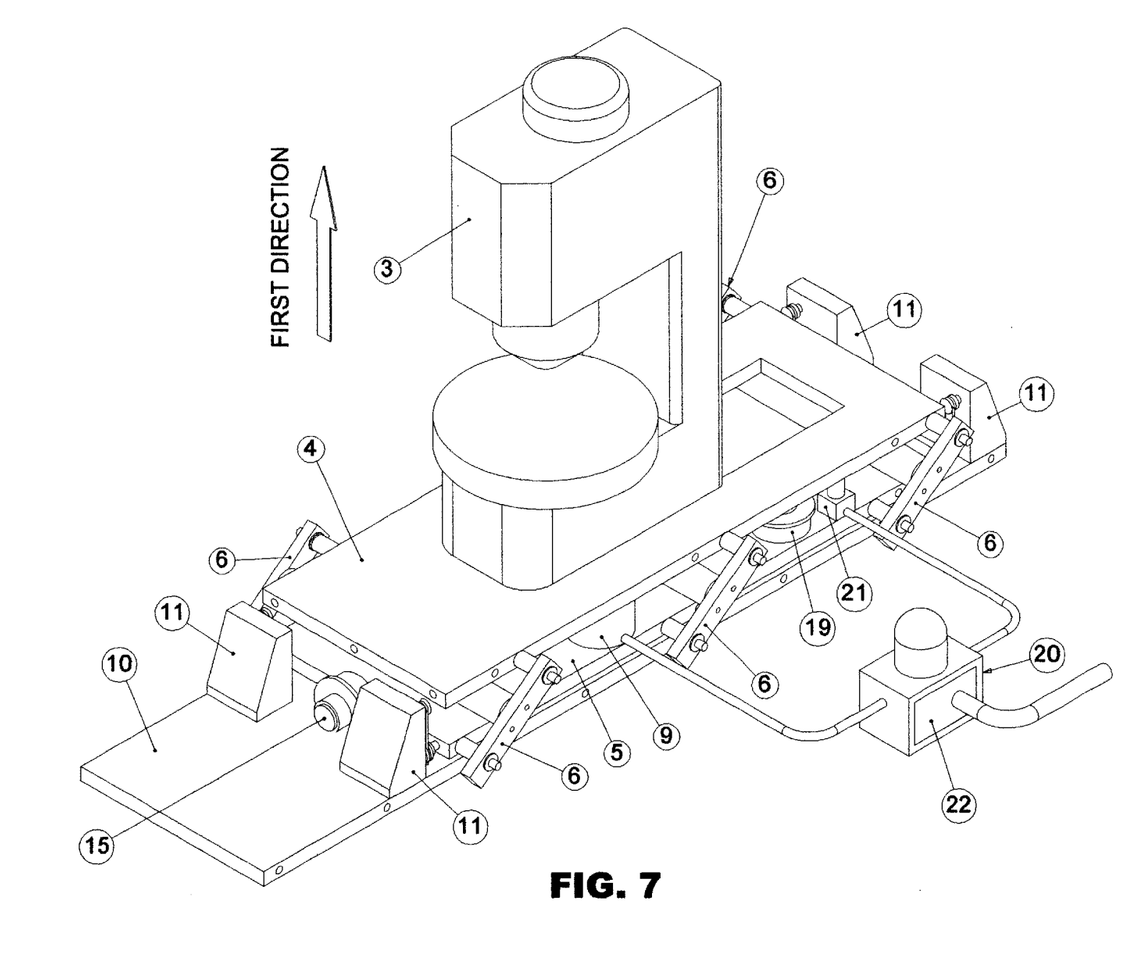
FIG. 7 is a schematic partial illustration of an automated system for maintaining a constant spacing between two load bearing structures of the isolator assembly 1 wherein an air spring is employed to provide a counter force.

FIG. 7 illustrates an automated system 20 that comprises a sensing means 21 to detect the gap between two load bearing structures and active means 22 such air pressure regulator to vary the air spring constant. As the mass of the load increases, the sensing means 21 detects a decrease of the separating gap between two load bearing means, therefore issues a command to the pressure regulator 22 for raising the air pressure to bring the gap back to the original setting. Vice versa, when the mass of the load experienced a decrease, the adjustment process is reversed.

Figure 8:
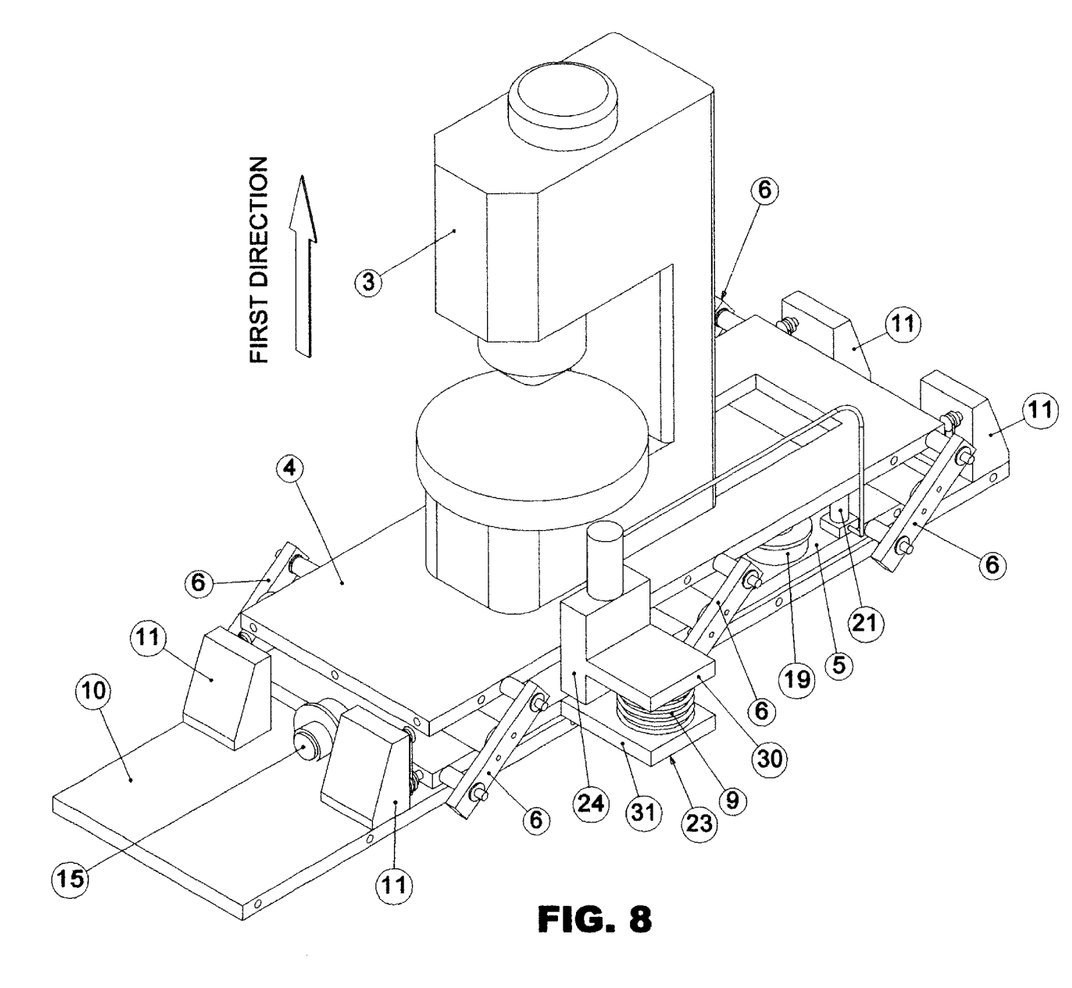
FIG. 8 is a schematic partial illustration of an automated system for maintaining a constant spacing between two load bearing structures of the isolator assembly 1 wherein a mechanical spring is employed to provide a counter force.

FIG. 8 illustrates an automated system 23 that comprises a sensing means 21 to detect the gap between two load bearing structures and an active means 24 such as a mechanical actuator mounted to the top load bearing structure 4 for moving the top spring mounting fixture 30 location with respect to the load bearing structures. As the mass of the load increases, the sensing means 21 detects a decrease of the separating gap between two load bearing structures due to an increase of the spring deformation, therefore issues a command to the actuator 24 to bring the top load bearing means 4 back to its original location. The adjusting process is reversed if there is a decrease in the load mass.

In application wherein the load may require rapid shifting of mass, as in a case of "fast start and stop" moving stages, acceleration and deceleration of a large mass create gross transient disturbances that requires a long period of time, in an order of several seconds, for all vibration to get damped out before any sensitive process can take place. It is conceivable to reduce the damping time by locking the load to a system equilibrium position referred as the home position during each rapid move of mass, while the process is not sensitive to vibration, therefore effectively minimizes the gross disturbances. Consequentially, It would be desirable to provide a homing system to bring and lock the load to the home position automatically.

Theoretically, the design of the present invention will return the load at equilibrium state to the home position, however in practice, due to variation in environmental conditions and other factors, the equilibrium position is not always coincident with the home position. Therefore, the homing system must be able to bring the load back to the home position before locking it into place.

Figure 9:
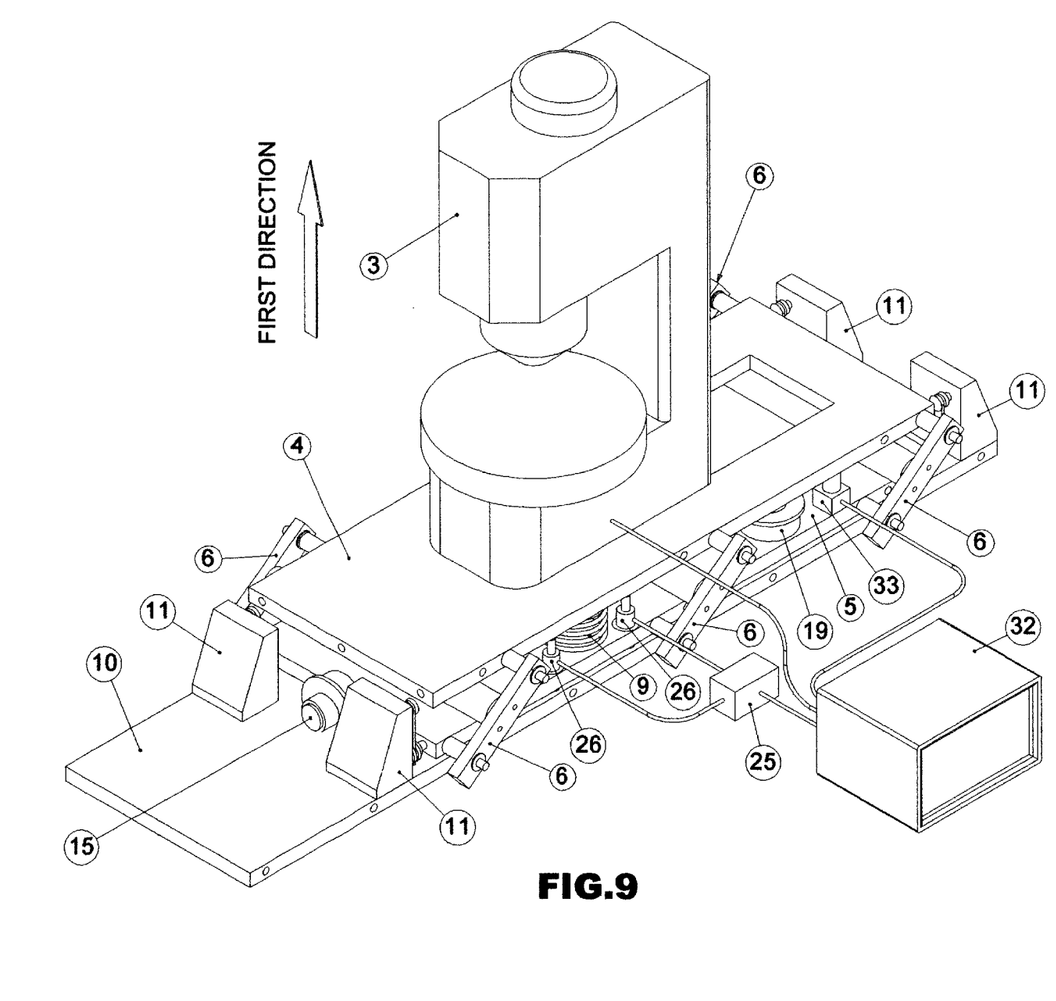
FIG. 9 is a schematic partial illustration of a homing system that can be employed in the present invention.
Figure 10:
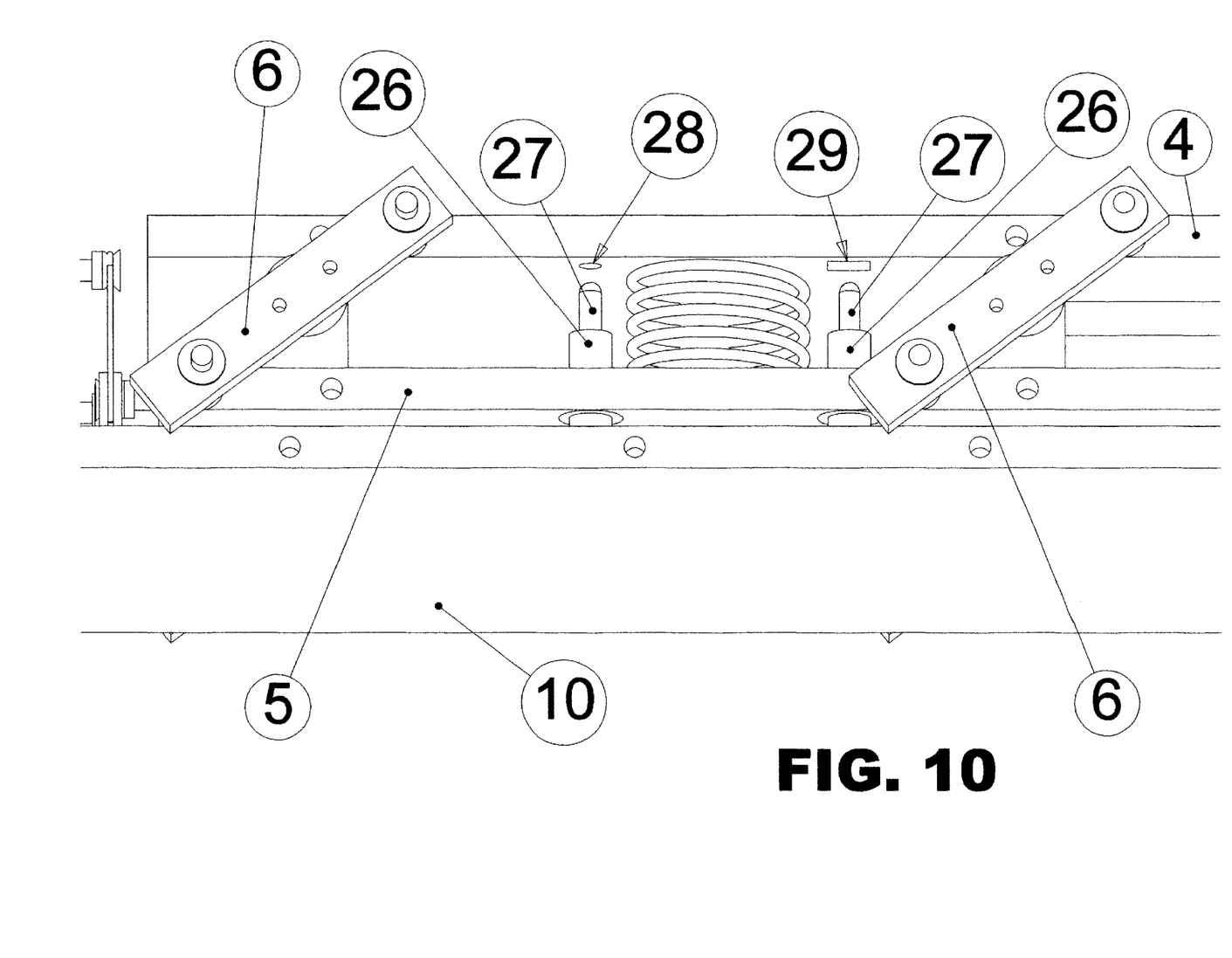
FIG. 10 is a schematic partial illustration of the mechanism of a homing system that can be employed in the present invention.
Figure 11:
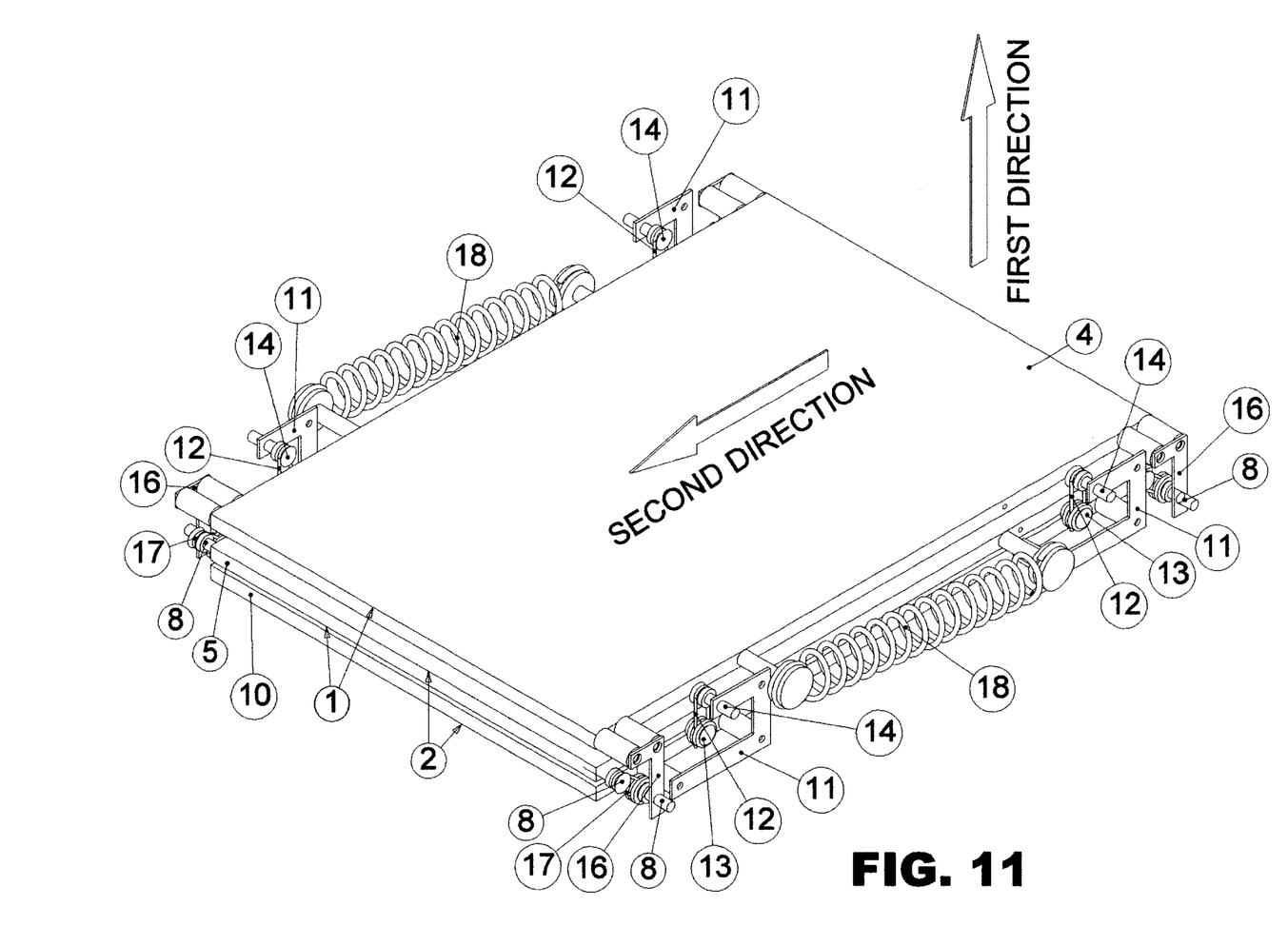
FIG. 11 is an isometric view of a schematic partial illustration of another vibration isolator apparatus that can be employed in the present invention.
Figure 12:
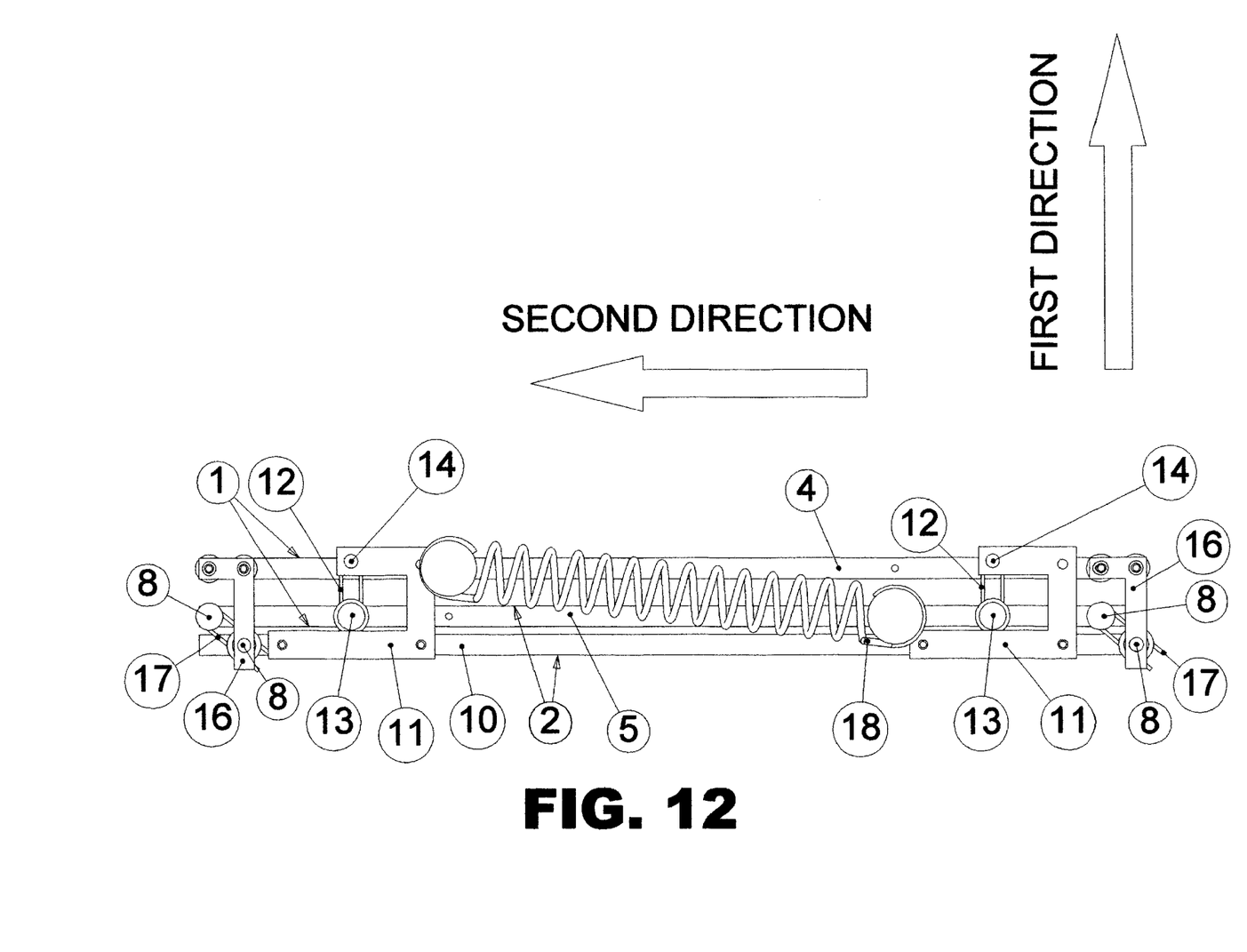
FIG. 12 is a side view of a schematic partial illustration of the vibration isolator apparatus shown in FIG. 11.
Figure 13:
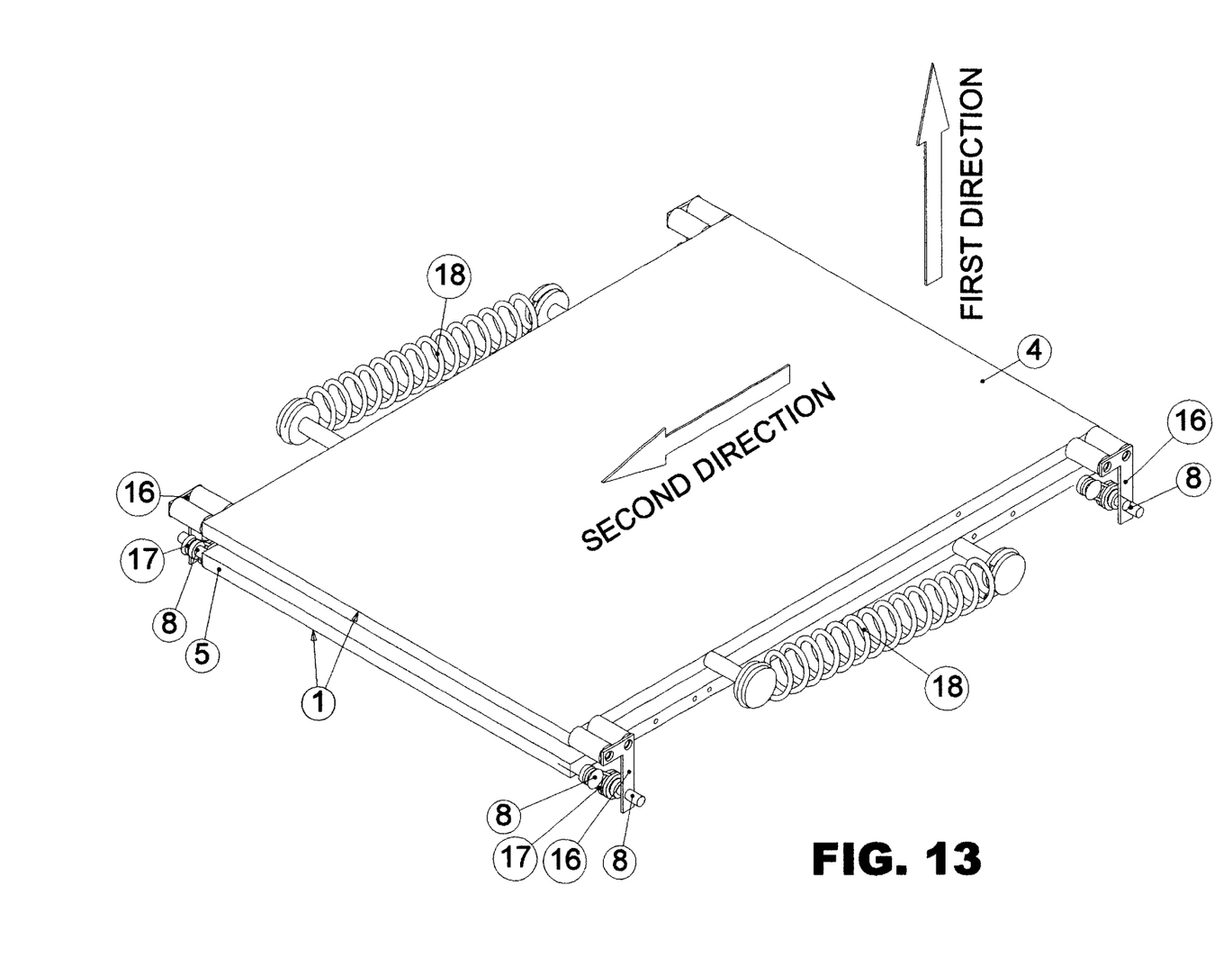
FIG. 13 is an isometric view of a schematic partial illustration of the isolator assembly 1 included in the vibration isolator apparatus shown in FIG. 11.
Figure 14:
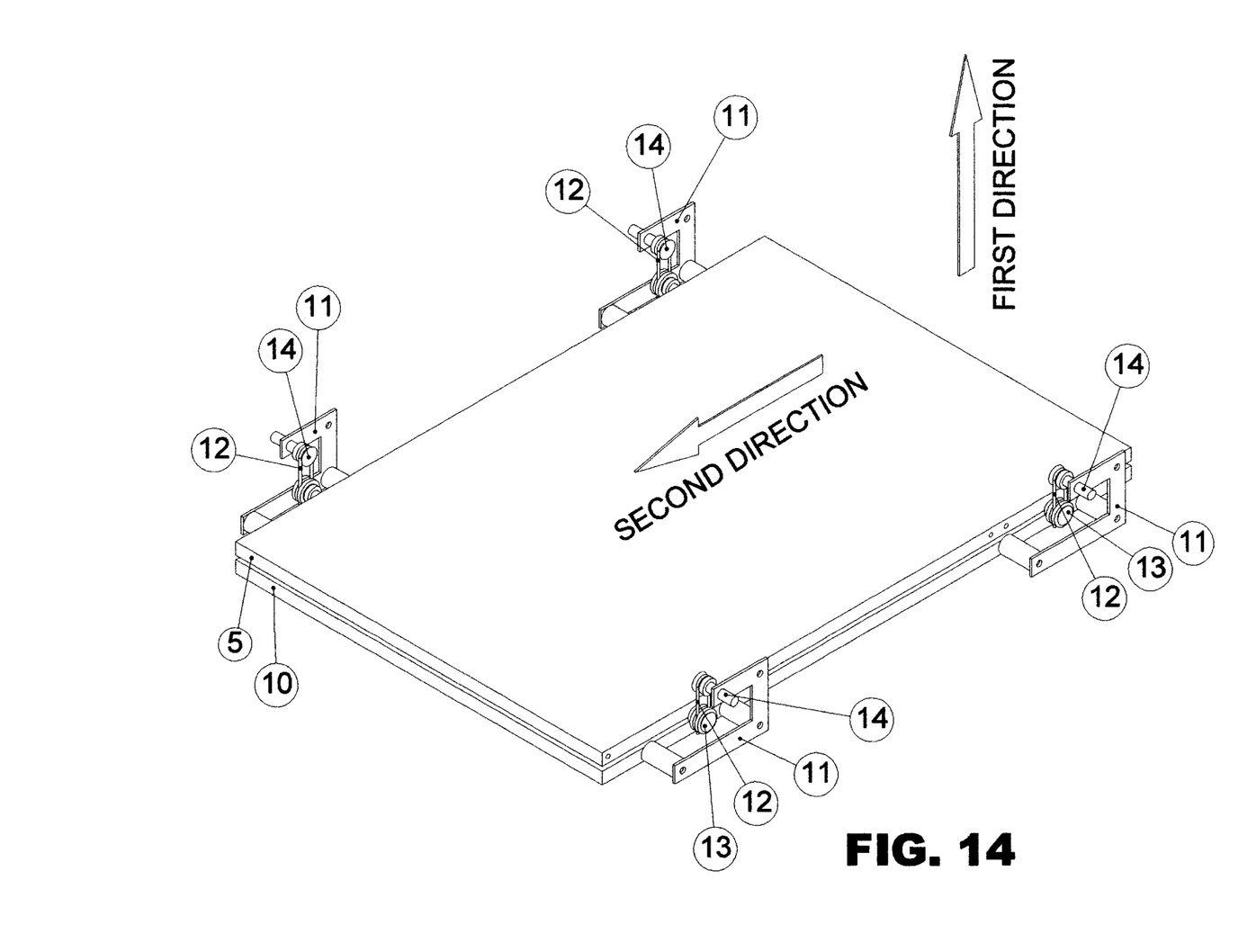
FIG. 14 is an isometric view of a schematic partial illustration of the isolator assembly 2 included in the vibration isolator apparatus shown in FIG. 11, wherein a pendulum assembly is employed.

FIG. 9 and FIG. 10 illustrate a homing system that comprises a controller 25, two linear actuators 26 mounted to the base structure 10, each of said actuators 26 has moving rods 27 with adjustable travel limits and conical or spherical ends, one chamfered circular registration aperture 28 and one registration V shape groove 29 provided on the bottom surface of the top load bearing structure 4; To lock the load into the home position, one actuator 26 inserts its rod end into said circular hole 28 and the other actuator 26 inserts its rod end into the groove 29; The travel limits of the said rods 27 must be adjusted so that their ends make complete contacts with the registration aperture 28 and groove 29 only when the top load bearing structure is located at home position. This effectively prevents the top load bearing structure 4 from any gross linear and rotational displacement caused by gross disturbances while it is locked. Furthermore, since the load is locked at the home position that is also the system equilibrium position, it requires no resettling time right after the system is unlocked. The controller 25 may receive the "LOCK" and "UNLOCK" commands from the load motion controller 32 that directs the load 3 motions and from a vibration sensing system 33 such as an accelerometer device that detects incoming gross disturbances.

It is obvious to a person skilled in the art that in theory, a bearing slip plate assembly should allow horizontal isolation by their decoupling effect. Such system may replace the pendulum assembly to provide the lateral isolation between the base structure 10 and the intermediate structure 5. In practice however, for such a design to work at low amplitude vibration would require precision ground hardened bearing with very small tolerance.

To reduce the cost and the complexity of the four bar linkage assembly, an alternative design is proposed and illustrated in FIG. 11, FIG. 12, FIG. 13 and FIG. 14. In this design, the top structure 4 may include a plurality of posts 16 that extrude downward along the first direction. The ends of said post 16 where the shafts 8 are located extend below the intermediate structure 5. A set of cables 17 interconnects the shafts 8 of the top structure 4 to the shafts 8 of the intermediate structure 5. To form a parallelogram mechanism that allows isolation in the first direction, a set of springs 18 provides a shearing force between the two load bearing structures in the second direction. This creates a misalignment between the cables 17 and the first direction, therefore provides needed compliancy for the isolation. This design can maintain the parallelism between the top and the intermediate load bearing structures if the center of gravity of the load moves only in the second direction.

Having described and disclosed my invention, I claim:

1. A vibration isolator which isolates a load that is separated from a floor, comprising:
    a first isolator assembly that provides isolation of the load in a first direction, said first isolator assembly comprises a parallelogram mechanism which may include two parallel load bearing means and a linkage mechanism interconnecting said two load bearing means, each members of the parallelogram may pivot about the connecting joints;
    a second isolator assembly that is attached to said first isolator assembly and provides passive isolation of the load in a second direction; and
    a counter force generating means that maintains a separating gap between the two load bearing means when a force is applied to said load bearing means, the said counter force generating means comprises a spring system that is coupled to two members of the parallelogram mechanism.

2. The vibration isolator of claim 1, wherein the counter force generating means further comprises a feedback control means connecting to the spring system to maintain the separating gap between the two load bearing means constant when the force applied to said load bearing means varies.

3. The vibration isolator of claim 1, wherein the first isolator assembly further comprises a damping system that is coupled to two members of said parallelogram mechanism.

4. The vibration isolator of claim 1, wherein the first isolator assembly is attached to the floor and the second isolator assembly is attached to the load.

5. The vibration isolator of claim 1, wherein the first isolator assembly is attached to the load and the second isolator assembly is attached to the floor.

6. A vibration isolator of claim 1, wherein the linkage mechanism of said parallelogram mechanism comprises a plurality of cables interconnecting the two load bearing means.

7. A vibration isolator of claim 6, wherein the counter force generating means may apply a shear force between the two load bearing means in a direction parallel to said load bearing means.

8. The vibration isolator of claim 6, wherein all rotating axes about which members of said parallelogram mechanism pivot are parallel to one direction perpendicular to the first direction.

9. The vibration isolator of claim 8, wherein two load bearing means of said parallelogram mechanism are perpendicular to the first direction.

10. The vibration isolator of claim 9, wherein the first direction is perpendicular to the horizontal plane.

11. A vibration isolator which isolates a load that is separated from a floor, comprising:
    a first isolator assembly that provides isolation of the load in a first direction, said first isolator assembly comprises a parallelogram mechanism which may include two parallel load bearing means and a linkage mechanism interconnecting said two load bearing means, each members of the parallelogram may pivot about the connecting joints;
    a second isolator assembly that is attached to said first isolator assembly and provides passive isolation of the load in a second direction; and
    a homing assembly that brings and secures the load to an equilibrium position.

12. The vibration isolator of claim 11, wherein said homing assembly comprises a plurality of pins that can be inserted into a plurality of apertures provided on a structure supporting the load.

13. The vibration isolator of claim 11, wherein the homing assembly receives "LOCK" and "UNLOCK" command signals from the load motion controller that directs the load motions.

14. The vibration isolator of claim 11, wherein the homing assembly receives "LOCK" and "UNLOCK" command signals from a motion sensing means that detects incoming gross disturbances asserted to the system.

15. A vibration isolator which isolates a load that is separated from a floor, comprising:
    a first isolator assembly that provides isolation of the load in a first direction perpendicular to the horizontal plane, said first isolator assembly comprises a parallelogram mechanism which may include two parallel load bearing means and a linkage mechanism interconnecting said two load bearing means, each members of the parallelogram may pivot about the connecting joints; and a second isolator assembly that is attached to said first isolator assembly and provides passive isolation of the load in a second direction parallel to the horizontal plane, said second isolator assembly comprises a pendulum assembly and a damping system that is coupled to said pendulum assembly and the floor.

* * * * *